(12) United States Patent
Self et al.

(10) Patent No.: US 8,548,713 B2
(45) Date of Patent: Oct. 1, 2013

(54) POWER DEMAND MANAGEMENT

(75) Inventors: Kristian Alexander Self, Horfield (GB); Geoffrey Radmore, Clifton (GB)

(73) Assignee: Rolls-Royce PLC, London (GB)

( * ) Notice: Subject to any disclaimer, the term of this patent is extended or adjusted under 35 U.S.C. 154(b) by 883 days.

(21) Appl. No.: 12/507,394

(22) Filed: Jul. 22, 2009

(65) Prior Publication Data

US 2010/0023239 A1    Jan. 28, 2010

(30) Foreign Application Priority Data

Jul. 24, 2008  (GB) .................................... 0813561.8
Jul. 22, 2009  (GB) .................................... 0912678.0

(51) Int. Cl.
*G06F 19/00* (2011.01)
*G06G 7/70* (2006.01)

(52) U.S. Cl.
USPC ............. 701/100; 701/99; 244/76 R; 244/221

(58) Field of Classification Search
USPC .................. 701/99, 100, 80, 110; 244/17.13, 244/195; 702/34; 60/773; 180/65.28; 700/36, 700/44
See application file for complete search history.

(56) References Cited

U.S. PATENT DOCUMENTS

| | | | | |
|---|---|---|---|---|
| 4,325,123 A | * | 4/1982 | Graham et al. ............... | 701/110 |
| 4,468,924 A | | 9/1984 | Moore | |
| 4,875,168 A | * | 10/1989 | Martin .............................. | 701/99 |
| 5,363,317 A | * | 11/1994 | Rice et al. ........................ | 702/34 |
| 5,730,394 A | | 3/1998 | Cotton et al. | |
| 5,927,655 A | * | 7/1999 | Larramendy et al. ......... | 244/195 |
| 6,393,355 B1 | * | 5/2002 | Muramatsu .................... | 701/100 |
| 6,742,742 B2 | * | 6/2004 | Claudet ....................... | 244/17.13 |
| 6,823,675 B2 | * | 11/2004 | Brunell et al. .................. | 60/773 |
| 7,599,750 B2 | * | 10/2009 | Piche .............................. | 700/36 |
| 7,854,283 B2 | * | 12/2010 | Vos et al. .................... | 180/65.28 |
| 8,209,101 B2 | * | 6/2012 | Breit .............................. | 701/80 |
| 2004/0057177 A1 | | 3/2004 | Glahn et al. | |
| 2006/0070779 A1 | | 4/2006 | Kuang et al. | |
| 2006/0112688 A1 | | 6/2006 | Vos et al. | |
| 2007/0055392 A1 | * | 3/2007 | D'Amato et al. ............... | 700/44 |
| 2007/0142975 A1 | | 6/2007 | Piche | |
| 2008/0058998 A1 | | 3/2008 | Breit | |

FOREIGN PATENT DOCUMENTS

| | | |
|---|---|---|
| EP | 1217128 A1 | 6/2002 |
| EP | 1420153 A2 | 5/2004 |
| EP | 1848084 A1 | 10/2007 |
| GB | 2027227 A | 2/1980 |

* cited by examiner

*Primary Examiner* — Thomas Black
*Assistant Examiner* — Robert Payne
(74) *Attorney, Agent, or Firm* — Gesmer Updegrove LLP

(57) ABSTRACT

A method is disclosed of determining the power demand on a power subsystem (2) of a system (1) by optimising a respective demand-dependent operating characteristic based on one or more operating conditions affecting the power subsystem, the method comprising: using a system-authority (3, 14) to determine system-level power demand limits on the basis of a system-level objective associated with an operating period; inputting the power demand limits to a separate power control processor (4, 16) configured for regulating the power demand on the power subsystem (2); determining each of said operating conditions; and using the power control processor (4, 16) autonomously to determine the overall power demand on the power subsystem (2) within said system-level limits, based on each of said operating conditions, thereby to optimise said operating characteristic. A method of regulating the power demand during the operating period is also disclosed. The method finds particular application in vehicles, turbomachinery and plant equipment, notably multi-engine aircraft and marine vehicles.

23 Claims, 3 Drawing Sheets

POWER DEMAND MANAGEMENT

PRIORITY

The present application claims priority to Great Britain Patent Application No. GB 0813561.8 filed on Jul. 24, 2008 and Great Britain Patent Application No. GB 0912678.0 filed on Jul. 22, 2009, the disclosures of which are hereby incorporated by reference in their entireties.

BACKGROUND

Many systems comprise some sort of power subsystem, which supplies power for a corresponding system function. Examples include vehicles and numerous machines for performing industrial or other processes.

The present invention relates in general to such systems and, in particular, seeks to provide an efficient and effective method of managing demand on a power subsystem, in particular a common method which can provide an effective platform for appropriate power demand management in a wide variety of applications and systems, notably vehicles, turbomachinery and plant equipment for performing work as part of an industrial process.

SUMMARY

The present invention is defined in the attached independent claims to which reference should now be made. Further, preferred features may be found in the sub-claims appended thereto.

According to one aspect of the present invention there is provided a method of managing the power demanded from one or more power sources forming part of a machine, the method comprising:
i) setting power demand constraints (or limits) for the or each power source, wherein the power demand constraints are a function of time and are based on an operational objective of the machine;
ii) setting a desired operating characteristic representing a mode in which it is desired to operate the machine and/or the or each power source;
iii) inputting the power demand constraints and the operating characteristic to a power control processor arranged for autonomously regulating the power demanded from the or each power source, the inputted power demand constraints representing a remit of delegated autonomy for the power control processor;
iv) for the or each power source, assessing one or more power source operating parameters and/or one or more fault conditions associated with the or each power source; and
v) using the power control processor to autonomously control the power demanded from the or each power source by:
   comparing the power demand constraints, operating characteristic and power source operating parameters and/or one or more fault conditions with data pre-stored in a storage device; and
   generating a power demand control signal for the or each power source;
      such that the power demanded from the or each power source is within the delegated remit of autonomy and the operation of the machine and/or the or each r source is optimised for the input operating characteristic.
Any or all of steps (i), (ii), (iii), (iv) or (v) may be repeated during the operational objective.

Step v) may be repeated at predetermined intervals of time. Step v) may be repeated in response to a change in one of the power demand constraints, a change in the operating characteristic, one or more of the power source operating parameters, or one or more of the fault conditions.

The operating characteristic may be energy efficiency or the operational life of the machine and/or the or each power source.

The machine may comprise a plurality of power sources and regulating the overall power demanded may comprise regulating the individual power demanded from each power source.

The power demand constraints may include a limit on the differential power demanded from two power sources. In certain systems, excessive differential power demand within the power subsystem may cause undesirable load imbalances. In the case of multi-engine vehicles in particular, an excessive differential power demand within the power subsystem manifest itself as an undesirable asymmetry in the propulsive force delivered by the power sources, depending upon the relative geometric positions of the power sources; this may be a particular problem in the case of multi-engine aircraft, where thrust asymmetry between wing-mounted engines may be detrimental to aircraft stability.

Using the power control processor to control the power demanded from the or each power source may comprise:
i) generating a plurality of power demand action plans as a function of the input operating characteristic, based on one or more power source operating parameters and/or one or more fault conditions; and
ii) determining a preferred one of the power demand action plans such that the operation of the machine and/or the or each power source is optimised for the input operating characteristic.

In one embodiment if the one or more power source operating parameters and/or one or more fault conditions are such that the overall power demanded cannot be met within the power demand constraints, the power control processor autonomously issues a request to the machine for adjustment of the power demand constraints and, in response to such adjustment, autonomously determines a preferred power demand action plan within the adjusted constraints.

Preferably the power source is a gas turbine. The machine may comprise two or more different forms of power source.

The method may be carried out separately for two more separate power subsystems of the machine, each power subsystem comprising one or more power source.

Preferably the machine is a vehicle. More preferably the machine is an aircraft.

The power demand constraints and/or the operating characteristic may be set by a pilot. The pilot may be an autopilot.

The present invention also relates to an apparatus arranged for use in the method according to any statement herein, the apparatus comprising one or more power control processors.

The invention further concerns a machine for carrying out the method, the machine comprising the apparatus according to any statement herein.

The invention also relates to a method of determining the power demand on a power subsystem of a system by optimising a respective demand-dependent operating characteristic based on one or more operating conditions affecting the power subsystem, the method comprising: using a system-authority to determine system-level power demand limits on the basis of a system-level objective associated with an operating period; inputting the power demand limits to a separate power control processor configured for regulating the power demand on the power subsystem; determining each of said operating conditions; and using the power control processor autonomously to determine the overall power demand on the power subsystem within said system-level limits, based on each of said operating conditions, thereby to optimise said operating characteristic.

The present invention follows in part from a respective analysis of the general factors affecting power demand management in systems; this analysis has revealed that, in fact, there are a number of factors which need to be accounted for in an effective method of managing power supply demand, but which have not tended to be accommodated for in conventional power demand management:

Thus, in general, it will be appreciated that a system will typically be operated in order to achieve a system-level objective. For example, in the case of a vehicle, the system-level objective may be to travel a certain distance in order to reach a desired destination. The system-level objective effectively imposes system-level power demand limits on the power subsystem.

However, the present invention recognises that for such systems there may be a number of different modes in which the system can be operated, within these limits, to achieve a system-level objective, and the preferred mode of operation may vary depending upon the desired "operating characteristic" for the system.

For example, in the case of a vehicle, the precise mode of operation of the vehicle might vary depending upon whether it is desired to take advantage of maximum vehicle 'performance', minimum emissions output, maximum energy efficiency or the maximum useful life of the power supply for that vehicle.

The optimal power demand, within system limits, may vary according to the particular desired operating characteristic (performance, emissions output, energy efficiency etc.).

In certain applications, the operating characteristic itself may change during a particular operating period for the system; for example, it may be desired to provide maximum vehicle performance until such time as a fault is detected in the power subsystem, but after such fault detection it may then be desired to prolong the operational life of the power subsystem, at the expense of vehicle performance if necessary.

In any case, in general for a given desired operating characteristic there will be a correlation between that operating characteristic and the demand on the respective power subsystem which will determine the optimal demand for a given operating characteristic and system-level objective.

For example, there may be a correlation between fuel efficiency in a vehicle and the power demand on the respective engine.

However, in practice the precise correlation may not be fixed, but rather may vary depending upon an operating condition affecting the power supply, which might include parameters associated with the operating environment for the power subsystem, such as temperature, and any faults which may have developed in the power subsystem.

Thus, for any given operating characteristic, the present invention recognises that optimal power demand will also be a function of one or more operating conditions affecting the power subsystem.

In the case where a power subsystem comprises more than one separate power source, for example multiple engines in an aircraft or marine vehicle, the optimal power demand will be a function of the individual optimal demand on each power source.

The invention may comprise any combination of the features and/or limitations referred to herein, except combinations of such features as are mutually exclusion.

BRIEF DESCRIPTION OF THE DRAWINGS

Embodiments of the invention will now be described, by way of example only, with reference to the accompanying figures, in which.

DETAILED DESCRIPTION

Figure 1:
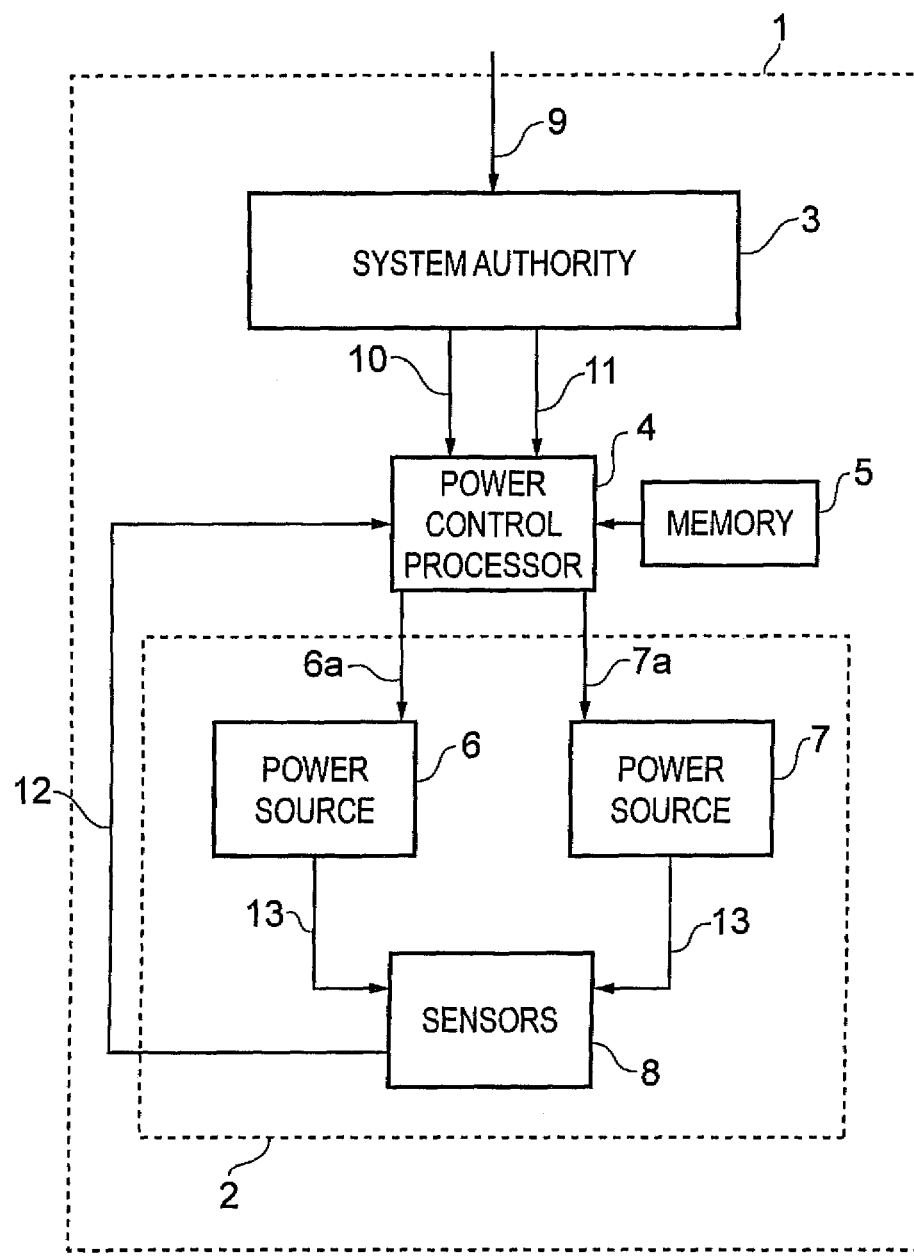
FIG. 1 is a schematic view showing a system.

FIG. 1 shows a system 1 (otherwise known as a machine) comprising a power subsystem 2 for providing power to perform a system function.

The system 1 comprises a system-authority 3, which has decision-making authority outside the ambit of the power subsystem 2 and which may therefore be considered as a "high level" decision-maker. The system-authority 3 may be an individual human operator of the system or, alternatively, may be an automatic or semi-automatic controller. The system-authority 3 is operably connected to a separate power control processor 4 for inputting data to the power control processor 4. It should be understood that, given its "high level" status, the system-authority will typically also be operably connected to a large number of other separate subsystems forming the system, though these have been omitted form FIG. 1 for the purposes of clarity.

The power control processor 4 is an autonomous processor, separate from the system-authority 3. The power control processor 4 is operably connected to a memory 5, for receiving inputted pre-stored data. In addition, the power control processor is operably connected to separate power sources 6, 7 within the power subsystem 2.

Each of the power sources 6, 7 may be any suitable power source, and need not be of the same general type. For example, power source 6 may be an electrical power source whilst power source 7 may be a mechanical power source. The power sources 6, 7 are each connected to a system of sensors 8 which receive data from the power sources on one or more suitable input channels (not represented in FIG. 1) concerning the operating condition of the power sources 6, 7. For example, the sensors 8 may capture data on the current value for particular operating parameters of each power source 6, 7 (e.g. operating temperature) and/or fault data following sensing of a fault condition in the power source 6, 7.

The sensors 8 are operably connected to the power control processor 4 to feed back the captured data on one or more output channels to the power control processor 4.

During an operating period for the system 1, the system 1 will generally have a system-level objective, that is, an objective for the system as a whole which is known to the system authority 3. The system-level objective will not typically be "known" to the power subsystem 2, in particular the power supply processor 4. Nevertheless, the system-level objective will impose corresponding objective-based demands on the power subsystem 2.

Figure 2:
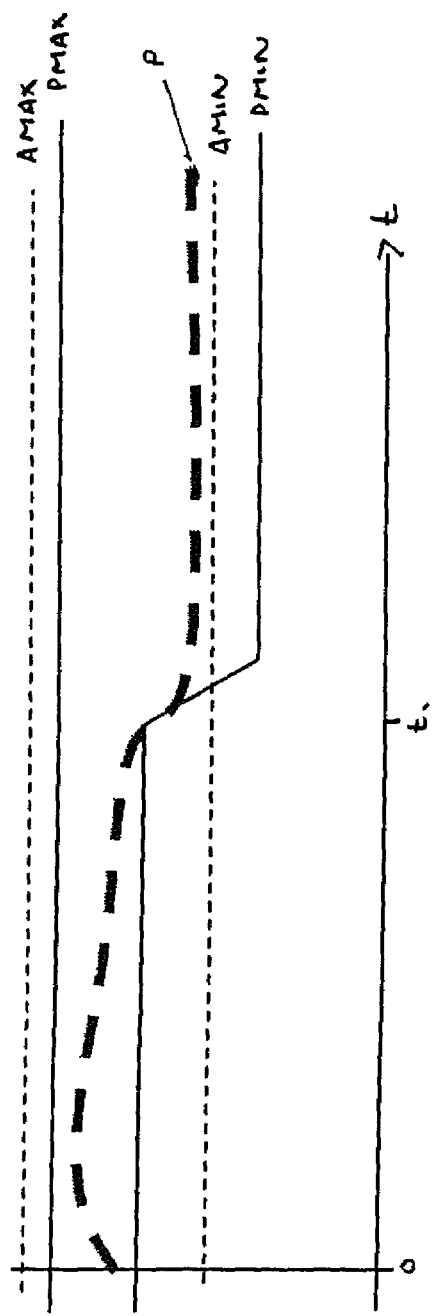
FIG. 2 is a schematic view showing power demand constraints as a function of time.

In the present case, this system-level objective 9 (otherwise known as an operating objective) is inputted to the system-authority 3 at the top of FIG. 1. Following input of the system-level objective 9, the system 1 may then be used to determine the demand on the power subsystem 2, as follows:

Firstly, the system-authority 3 is used to determine system-level power demand limits (otherwise known as constraints) on the basis of the system-level objective 9, that is, power demand limits which will ensure that the system 1 can meet the system-level objective 9. With reference to FIG. 2, the power-demand limits will generally include a maximum limit (PMAX) and minimum limit (PMIN) on the overall power demand on the power subsystem 2 as a whole, that are a function of time (t). However, they may also include other limits as appropriate depending upon the particular system application. For example, the power demand limits might include time dependent limits on the degree of power demand asymmetry (AMAX, AMIN) between the power sources 6, 7. These system-level time-ranging power demand limits 10 are inputted to the power control processor 4.

The power limits (or constraints) will generally vary with respect to time and will depend on the operational objection of the machine. With reference to FIG. 2, if the machine is an aircraft, for example, from t=0 to t=t, the aircraft may be taking off and therefore the minimum amount of power required (PMIN) is greater than when the aircraft is cruising (t>$t_1$).

A signal 11 representing a desired operating characteristic is also inputted to the power control processor 4. The desired operating characteristic may be a system-level operating characteristic determined by the system-authority, for example handling characteristics in the case of a vehicle such as an aircraft, or may be a subsystem level operating characteristic, for example the operational life of the power subsystem 2. In any case, the operating characteristic will be a "demand-dependent" characteristic, that is, it may be expressed as a function of the demand on the power subsystem 2 (or the demand distribution on the power sources 6, 7). Depending upon the nature of the operating characteristic, this may effectively be inputted from any suitable source within the system; in this specific case, the signal 11 is shown inputted by the system-level authority 3 in FIG. 1. Examples of the operating characteristic include maximum speed, minimum time, minimum fuel consumption, minimum emissions. The operating characteristic may change during the operation of the machine or may be a function of time.

In addition to the system-level objective 9 and the operating characteristic 11, the power control processor 4 is also provided with data concerning one or more operating conditions for the power sources 6, 7. These operating conditions 12 (which might be considered to be data gathered at a "power-source level") are inputted from the sensors 8 having been determined following suitable data capture 13 by the sensors 8 from the power sources 6, 7. As mentioned above, the operating conditions 12 may include the instantaneous value of one or more operating parameters of the power source. 6, 7 and/or fault data following detection of a fault by the sensors 8. In any case, the operating conditions will be operating conditions affecting the power subsystem 2, that is, the power delivered by the power subsystem 2 may in general terms be expressed as a function of each operating condition.

Once the power demand limits 9, operating characteristic 11 and operating conditions 12 have been inputted to the power control processor 4, the power control processor 4 is used autonomously to determine the power demanded from the power sources of the power subsystem 2 within said limits 9, on the basis of the conditions 12, thereby to optimise the characteristic 11. Here, "optimise" is intended to mean optimisation of the power demand within the limits 10 and "power demanded" is intended to include both overall power demand on the power subsystem 2 and, where appropriate, the demand distribution between the power sources 6, 7. This is represented by 'P' in FIG. 2.

The optimal power demand is determined using suitable pre-stored data retrieved from the memory 5. Such data may include "mapping" functions for mapping the power demand to a corresponding value of the operating characteristic 11 as a function of the operating conditions 12, as well as "optimisation" algorithms for optimising the power demand distribution between the power sources 6, 7 within the power demand limits 10.

In the case where there is more than one power source, as in FIG. 1, the optimal power demand will comprise an individual power setting for each power source. Thus, in FIG. 1 respective power demand signals 6a, 7a are sent to each power source 6, 7 possibly via a suitable control unit (not shown).

The above method of determining the optimal demand may be repeated during the operating period of the machine (i.e. during the operational objective) effectively to regulate the power demand on the power subsystem 2 during the operating period, autonomously of the system-authority 3. The method of determining the optimal demand may be repeated in response to a change in the desired operating characteristic, a change in the system level-objective (implying a change in one or more power demand limits), or a change in one of the operating conditions (including a fault condition). Alternatively, the method may be repeated at the autonomous request of the power supply processor 4, preferably at regular pre-determined intervals.

It will be appreciated that, following input of the system-level objective 9 and operating characteristic 11 by the system authority 3, the power control processor 4 may thus operate autonomously of the system-authority 3 to regulate the power demand on the power sources 6,7 within an effective delegated remit of autonomy determined by the power demand limits 10. Such regulation may take place without ongoing dialogue with the system authority 3 and it is envisaged will therefore not increase the burden on the system authority 3.

It is believed that regulation of power demand in the above manner provides a platform for power demand management in a wide variety of applications.

Figure 3:
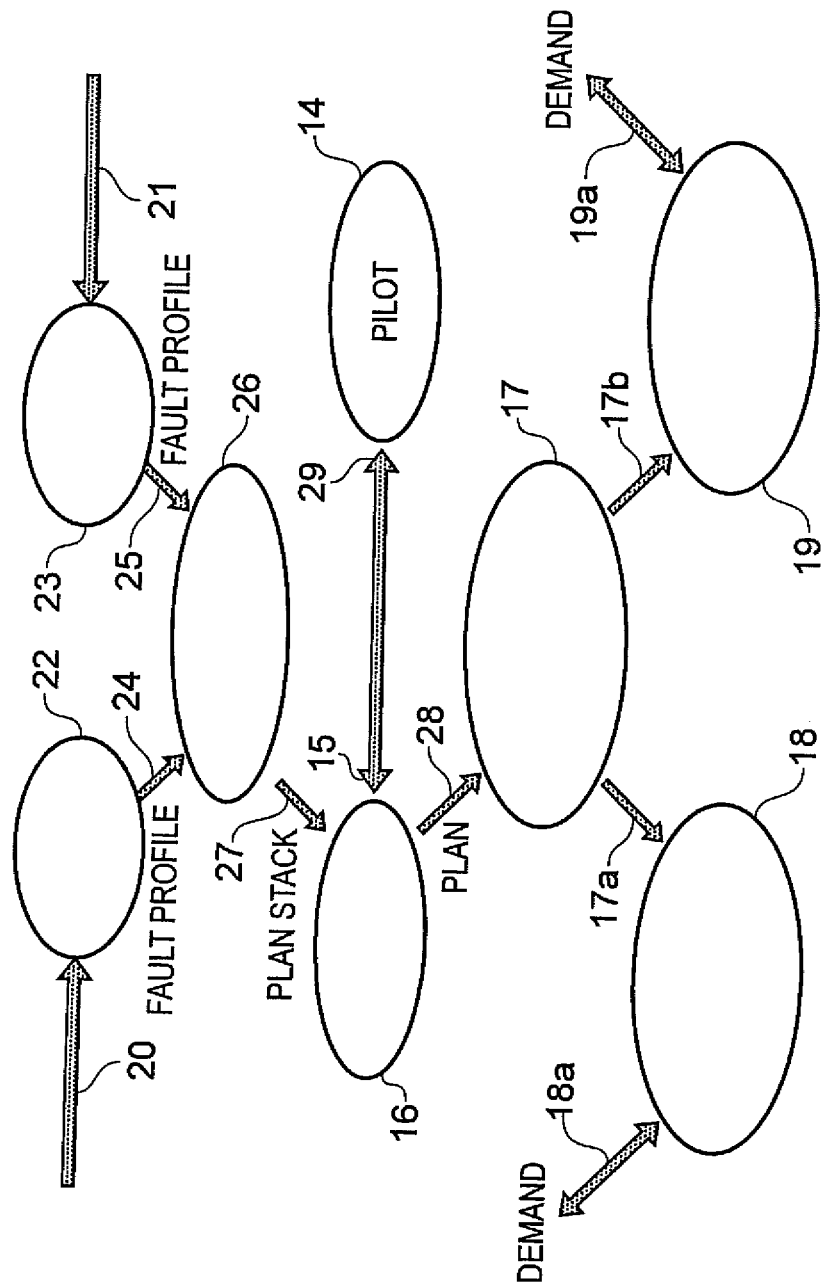
FIG. 3 is a schematic view showing an aircraft system.

By way of example, FIG. 3 shows how the method might readily be implemented in an aircraft. Here, the method is being used to regulate demand on a respective power subsystem comprising twin gas turbine engines (not shown), thereby to optimise the operational life of the power subsystem (being the desired operating characteristic) taking account of the fault condition of each engine (being relevant operating conditions affecting the power subsystem).

The system-level objective in this case will be a relevant mission objective of the aircraft.

The system-level authority takes the form of a pilot 14, which may be a human pilot or an "auto-pilot", in the sense of an automatic controller that performs the function of a pilot.

The pilot 14 inputs relevant power demand limits (constraints) 15 to a corresponding, separate power control processor 16 based on the mission objective. Here, it is envisaged that the power demand limits 15 will include limits on the overall thrust demand on the engines, as well as limits on the differential thrust demand, corresponding to the degree of thrust asymmetry between the engines.

The initial thrust demand is determined autonomously by the power control processor 16 in order to optimise the operational life of the power subsystem on the basis of fault condition signals 20, 21 inputted by the Engine Health Management unit (EHM) for each engine (not shown).

Each fault condition signal 20, 21 is based on sensor data inputted to the EHM, which may indicate one or more faults associated with the respective engine or may alternatively indicate a "null" fault condition corresponding to full engine health.

The fault condition signals 20, 21 are inputted to respective processors 22, 23 which generate respective "fault profiles" by determining the effect of the fault condition on the operational life of the respective engine as a function of the (theoretical) thrust demand on that engine.

These "fault profiles" 24, 25 generated by the processors 22, 23 are inputted to a further processor 26 which determines a set of power demand action plans for the power subsystem (which incorporates both engines) as a function of the operational life of the power subsystem, and on the basis of the fault profile for each engine.

A suitable "transfer function" and corresponding "transfer data" may be used by the processor 26 to 'map' the individual fault profiles onto a suitable set of power demand action plans for the subsystem. The transfer function may be based on prior test data where appropriate and may be retrieved from an on-board memory (not shown) associated with the processor 26.

The power demand "plan stack" 27 generated by the processor 26 is inputted into the power control processor 16. The power control processor 16 then autonomously determines whether implementation of one or more of the power demand action plans is within the power demand limits 15. If one or more of the power demand action plans is within the power demand limits 15, the processor 26 autonomously determines a preferred one of the power demand action plans 27 using a suitable optimisation algorithm (again, retrievable from memory) which selects the plan that optimises the operational life of the subsystem.

The optimal plan 28 is then inputted to a thrust distribution controller 17. The thrust distribution controller 17 processes the power demand action plan to provide a corresponding instruction 17a, 17b to respective FADEC controllers 18, 19 which in turn generate control signals 18a, 19a to adjust the thrust delivered by the respective engines (not shown) to meet the initial thrust demand, possibly utilising a conventional feedback control loop from the FADEC.

If none of the power demand action plans 27 are within all of the power demand limits 15, so that demand cannot be met within said limits, the processor 26 issues a request 29 to the pilot 14 for adjustment of the power demand limits 15. If the pilot is able to grant the request for adjustment of the power demand limits (perhaps on the basis of adjustment of the mission objective) then the power demand limits 15 are adjusted by the pilot and the processor 26 re-assesses whether any of the power demand action plans 27 can be implemented within the adjusted limits. Alternatively, the pilot 14 may effectively override the autonomy of the processor 16 by issuing an override instruction to the processor 16 that the initial (likely sub-optimal) thrust demand be set within corresponding "hard" power demand limits imposed on the processor 16 by the pilot 14.

Once the initial thrust demand has been determined, the power control processor 16 may continually monitor its various input channels and where there is a change in input the above method may be repeated; in this manner, the power control processor 16 may regulate the optimal demand on the power subsystem during the mission, without dialogue with the pilot 14. Alternatively, the power control processor 16 may be configured for repeating determination of the optimal demand only in response to a change in fault condition or change in the power demand limits 15 during the mission. In the latter case, one or more of the power demand limits may change independently; for example, in the case where the power demand limits include an overall power demand limit and an "asymmetry" limit, the asymmetry limit may change and but the overall demand limit may remain constant, or vice versa. The limits thus nevertheless continuously define the effective remit of delegated autonomy for the power control processor 16, and the power control processor 16 acts within this remit of autonomy to optimise the demand on the power subsystem during the mission.

Although in the embodiments described, the system only comprises a single power subsystem, it is envisaged that a system may comprise (functionally) separate power subsystems (as distinct from separate powers sources within a power subsystem). In this case, the power control processor may be used separately to regulate the power demand on each separate power subsystem to optimise a respective operating characteristic within respective system-level power demand limits based on a respective system-level objective.

It is envisaged that in any case the system may incorporate a degree of redundancy in order to mitigate the effect of faults affecting the power supply control processor. This may be particularly preferable where the power supply control processor is autonomously controlling more than one power subsystem.

Those skilled in the art will appreciate that numerous modifications and variations may be made to the above disclosed embodiments without departing from the spirit and scope of the invention.

What is claimed is:

1. A method of managing the power demanded from one or more power sources forming part of a powered machine, the method comprising:
   i) setting time-varying power demand constraints for each of the one or more power sources, wherein the time-varying power demand constraints are set as a function of time and vary with time and are based on an operational objective of the machine;
   ii) setting a desired operating characteristic representing at least one of a) a mode in which it is desired to operate the machine and b) a mode in which it is desired to operate each of the one or more power sources of the machine;
   iii) inputting the time-varying power demand constraints and the operating characteristic to a power control processor arranged for autonomously regulating the power demanded from each of the one or more power sources within the inputted power demand constraints which represent a remit of delegated autonomy for the power control processor;
   iv) for each of the one or more power sources, determining one or more power source operating parameters and/or one or more fault conditions associated with each of the one or more power sources; and
   v) using the power control processor to autonomously control the power demanded from each of the one or more power sources by:
      generating a power demand control signal for each of the one or more power sources, based on the power demand constraints, the operating characteristic and power source operating parameters and/or one or more fault conditions with data pre-stored in a storage device; such that the power demanded from each of the one or more power sources is within the delegated remit of autonomy and the operation of the machine and/or operation of each of the one or more power sources is optimised for the input operating characteristic.

2. A method according to claim 1, comprising repeating step i) during the operational objective.

3. A method according to claim 1, comprising repeating step ii) during the operational objective.

4. A method according to claim 1, comprising repeating step iii) during the operational objective.

5. A method according to claim 1, comprising repeating step iv) during the operational objective.

6. A method according to claim 1, comprising repeating step v) during the operational objective.

7. A method according to claim 6, wherein step v) is repeated at predetermined intervals of time.

8. A method according to claim 6, wherein step v) is repeated in response to a change in one of the time-varying power demand constraints, a change in the operating characteristic, one or more of the power source operating parameters, or one or more of the fault conditions.

9. A method according to claim 1, wherein the operating characteristic is energy efficiency.

10. A method according to claim 1, wherein the operating characteristic is the operational life of the machine and/or each of the one or more power sources.

11. A method according to claim 1, wherein the machine comprises a plurality of power sources and regulating the overall power demanded comprises regulating the individual power demanded from each power source.

12. A method according to claim 11, wherein the time-varying power demand constraints include a limit on the differential power demanded from two power sources.

13. A method according to claim 1, wherein using the power control processor to control the power demanded from each of the one or more power sources comprises:
  i) generating a plurality of power demand action plans as a function of the input operating characteristic, based on one or more power source operating parameters and/or one or more fault conditions; and
  ii) determining a preferred one of the power demand action plans such that at least one of a) the operation of the machine is optimised for the input characteristics and b) the operation of each of the one or more power sources is optimised for the input operating characteristic.

14. A method according to claim 13, wherein if the one or more power source operating parameters and/or one or more fault conditions are such that the overall power demanded cannot be met within the power demand constraints, the power control processor autonomously issues a request to the machine for adjustment of the power demand constraints and, in response to such adjustment, autonomously determines a preferred power demand action plan within the adjusted constraints.

15. A method according to claim 1, wherein the power source is a gas turbine.

16. A method according to claim 1, wherein the machine comprises two or more different forms of power sources.

17. A method according to claim 1, wherein the method is carried out separately for two more separate power subsystems of the machine, each power subsystem comprising one or more power sources.

18. A method according to claim 1, wherein the machine is a vehicle.

19. A method according to claim 18, wherein the machine is an aircraft.

20. A method according to claim 18, wherein the power demand constraints and/or the operating characteristic is set by a pilot.

21. A method according to claim 20, wherein the pilot is an autopilot.

22. An apparatus arranged for use in the method of claim 1, the apparatus comprising one or more power control processors.

23. A machine for carrying out the method of claim 1.

* * * * *